US012807307B2

(12) United States Patent
Allen

(10) Patent No.: US 12,807,307 B2
(45) Date of Patent: Nov. 24, 2026

(54) NOSE-WHEEL STEERING SPLIT CONTROL ARCHITECTURE SYSTEMS AND METHODS

(71) Applicant: Goodrich Corporation, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/630,622

(22) Filed: Apr. 9, 2024

(65) Prior Publication Data

US 2025/0313335 A1 Oct. 9, 2025

(51) Int. Cl.
*B64C 25/50* (2006.01)

(52) U.S. Cl.
CPC .................................... *B64C 25/50* (2013.01)

(58) Field of Classification Search
CPC .............................. B64C 25/50; B64C 25/505
USPC ............................................................ 244/50
See application file for complete search history.

(56) References Cited

U.S. PATENT DOCUMENTS 3,015,311 A * 1/1962 Ashton ................. B64C 25/505 244/50
3,018,073 A * 1/1962 Bent ....................... B64C 25/46 188/181 A
3,391,580 A * 7/1968 Stadler .................. B64C 25/505 91/375 R
3,446,459 A * 5/1969 Reese ................... B64C 25/505 244/50
6,769,251 B2 8/2004 Collet et al.
10,836,474 B2 11/2020 Lindahl et al.
11,433,993 B2 9/2022 Allen
11,713,110 B2 8/2023 Rawdon
2005/0082427 A1 4/2005 Seung
2016/0101848 A1* 4/2016 Forrester, Jr. ....... F16K 11/0856 137/625.48
2016/0101849 A1* 4/2016 Liegeois ................ B64C 25/34 244/50
2019/0063472 A1* 2/2019 Blanding ................ F04B 1/328
2019/0193704 A1* 6/2019 Zell ....................... F15B 20/008
2022/0281591 A1* 9/2022 Allen ...................... B64C 25/22

FOREIGN PATENT DOCUMENTS

CN 115556926 A * 1/2023 ........... B64C 25/505

* cited by examiner

*Primary Examiner* — Christopher D Hutchens
(74) *Attorney, Agent, or Firm* — SNELL & WILMER L.L.P.

(57) ABSTRACT

A wheel steering system includes a hydraulic steering control system including a steering rate servo valve disposed in close proximity to a hydraulic pump and a mode selection valve disposed in close proximity to a hydraulic actuator. The steering rate servo valve is in a separate flow path from the primary flow path between the hydraulic pump and the mode selection valve. The mode selection valve is moveable between a steering off/free caster shimmy damper position, a steer left position, and a steer right position. The mode selection valve controls a hydraulic actuator. The hydraulic actuator can control rotation of a collar gear to thereby control steering of a wheel assembly.

20 Claims, 6 Drawing Sheets

NOSE-WHEEL STEERING SPLIT CONTROL ARCHITECTURE SYSTEMS AND METHODS

FIELD

The present disclosure relates generally to aircraft steering systems and, more particularly, to aircraft nose-wheel steering systems.

BACKGROUND

Aircraft typically employ nose-wheel steering systems to steer the aircraft while taxiing on the ground. For aircraft of large size, one or more steerable bogies are sometimes provided on the main landing gear, in addition to the steering device for the nose landing gear.

The steerable portions of landing gear are generally controlled using one or more actuators fed by a pressure generator device of the aircraft via a hydraulic steering assembly. In conventional manner, the hydraulic steering assembly comprises a directional control valve serving to deliver fluid to the actuator(s) so as to control the steering of the steerable portion of the landing gear in response to orders from the pilot. The hydraulic steering assembly receives pressurized hydraulic fluid from a hydraulic pump and provides the pressurized hydraulic fluid to the actuator(s). The various hydraulic components located between the hydraulic pump and the actuator can contribute to pressure drops in the system.

SUMMARY

A nose-wheel steering system is disclosed herein. In accordance with various embodiments, the nose-wheel steering system includes a collar gear operatively coupled to a strut piston and configured to rotate the strut piston about a piston axis of rotation. The nose-wheel steering system further includes a hydraulic actuator operatively coupled to the collar gear and configured to drive a rotation of the collar gear. The nose-wheel steering system further includes a steering rate servo valve configured to control a flow rate of a hydraulic fluid from a hydraulic fluid source through the hydraulic actuator. The nose-wheel steering system further includes a mode selection valve moveable between a steering off position, a steer left position, and a steer right position. In the steer right position, the mode selection valve directs the hydraulic fluid through the hydraulic actuator in a first direction. In the steer left position, the mode selection valve directs the hydraulic fluid through the hydraulic actuator in a second direction opposite the first direction.

These and other embodiments can include one or more of the following features. The nose-wheel steering system can further include a first conduit fluidly coupled to the hydraulic actuator and a second conduit fluidly coupled to the hydraulic actuator. The mode selection valve can be coupled to the first conduit and the second conduit, the mode selection valve being configured to control fluid flow direction to the hydraulic actuator via each of the first conduit and the second conduit. The nose-wheel steering system can further include a steering controller operably coupled to the mode selection valve, wherein the steering controller is configured to control actuation of the mode selection valve. The nose-wheel steering system can further include a first piloting solenoid valve and a second piloting solenoid valve, wherein the steering controller is configured to control actuation of the mode selection valve via the first piloting solenoid valve and the second piloting solenoid valve.

The nose-wheel steering system can further include a hydraulic fluid line coupled between the hydraulic fluid source and the mode selection valve and a separate hydraulic fluid line whereby the steering rate servo valve receives hydraulic fluid pressure from the hydraulic fluid line. A hydraulic fluid pressure can be communicated between the hydraulic fluid source and the mode selection valve independent of the steering rate servo valve.

In various embodiments, a fluid flow path between the hydraulic fluid source and the mode selection valve is independent of the steering rate servo valve.

In various embodiments, in the steering off position, the mode selection valve forms a constriction between the first conduit and the second conduit in a shimmy damper free caster mode.

In another aspect, an aircraft landing gear assembly is generally disclosed. The aircraft landing gear assembly can include a shock strut assembly including a strut cylinder and a strut piston configured to telescope relative to the strut cylinder. The aircraft landing gear assembly can further include a steering system coupled to the shock strut assembly and configured to rotate the strut piston about a piston axis of rotation. The steering system includes a hydraulic actuator configured to drive rotation of a gear about a second axis, a collar gear intermeshed with the gear and configured to rotate about the piston axis of rotation, a steering rate servo valve configured to control a flow rate of a hydraulic fluid from a hydraulic fluid source, and a mode selection valve moveable between a steering off position, a steer left position, and a steer right position. In the steer right position, the mode selection valve directs the hydraulic fluid through the hydraulic actuator in a first direction. In the steer left position, the mode selection valve directs the hydraulic fluid through the hydraulic actuator in a second direction opposite the first direction.

These and other embodiments can include one or more of the following features.

In various embodiments, the steering system further includes a first conduit fluidly coupled to the hydraulic actuator, a second conduit fluidly coupled to the hydraulic actuator, and the mode selection valve is coupled to the first conduit and the second conduit, the mode selection valve being configured to control fluid flow direction to the hydraulic actuator via each of the first conduit and the second conduit.

In various embodiments, the hydraulic actuator is rotationally coupled to the collar gear via a drive shaft.

In various embodiments, the aircraft landing gear assembly further includes a steering controller operably coupled to the mode selection valve, wherein the steering controller is configured to control actuation of the mode selection valve. In various embodiments, the aircraft landing gear assembly further includes a first piloting solenoid valve and a second piloting solenoid valve, and the steering controller is configured to control actuation of the mode selection valve via the first piloting solenoid valve and the second piloting solenoid valve.

In various embodiments, the aircraft landing gear assembly further includes a hydraulic fluid line coupled between the hydraulic fluid source and the mode selection valve, and a separate hydraulic fluid line whereby the steering rate servo valve receives hydraulic fluid pressure from the hydraulic fluid line, and a hydraulic fluid pressure is communicated between the hydraulic fluid source and the mode selection valve independent of the steering rate servo valve.

In various embodiments, the hydraulic actuator comprises a hydraulic rotary actuator.

In various embodiments, the steering system further comprises a gear train rotationally coupled between the drive shaft of the hydraulic actuator and the gear.

In various embodiments, in the steering off position, the mode selection valve forms a constriction between the first conduit and the second conduit in a shimmy damper free caster mode.

In another aspect, an architecture for a hydraulic steering control system is generally disclosed. The architecture can include a hydraulic actuator, a first conduit fluidly coupled to a first hydraulic chamber of the hydraulic actuator, a second conduit fluidly coupled to a second hydraulic chamber of the hydraulic actuator, a mode selection valve moveable between a steering off position, a steer left position, and a steer right position, and a steering rate servo valve configured to control a flow rate of a hydraulic fluid being supplied to the mode selection valve from a hydraulic fluid source through the hydraulic actuator. In the steer right position, the mode selection valve directs the hydraulic fluid to the first hydraulic chamber of the hydraulic actuator via the first conduit. In the steer left position, the mode selection valve directs the hydraulic fluid to the second hydraulic chamber of the hydraulic actuator via the second conduit.

These and other embodiments can include one or more of the following features. In various embodiments, the hydraulic actuator is configured to rotate a strut piston about a piston axis of rotation. In various embodiments, architecture further includes a hydraulic fluid line whereby the mode selection valve receives hydraulic fluid from the hydraulic fluid source and a separate hydraulic fluid line forming a flow path that is separate from a flow path of the hydraulic fluid that is received by the mode selection valve from the hydraulic fluid source.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Systems, apparatus, and methods of the present disclosure include a hydraulic steering unit that includes a mode selection valve located locally with a rotary hydraulic valve for steering a wheel, such as a nose landing gear wheel assembly for example. A larger fluid volume between the directional control valve and the actuator can undesirably decrease frequency response and response time of the system. By disposing the mode selection valve locally with the hydraulic actuator, the hydraulic fluid volume between the mode selection valve and the hydraulic actuator is decreased. Accordingly, the frequency response, controllability, stiffness, and/or effective bulk modulus of the system is increased. The system further includes a servo valve located locally with a hydraulic pump. The servo valve is fluidly coupled so that hydraulic fluid flowing from the hydraulic pump toward the mode selection valve and/or the hydraulic actuator does not necessarily flow through the servo valve. Stated differently, the servo valve is connected to a hydraulic line that branches off of the main hydraulic line connecting the pump and the mode selection valve. In this manner, the pressure drop between the pump and the hydraulic actuator is decreased (and a size of the electric motor can also be decreased) compared to if the servo valve were connected in series between these two components.

Figure 1:
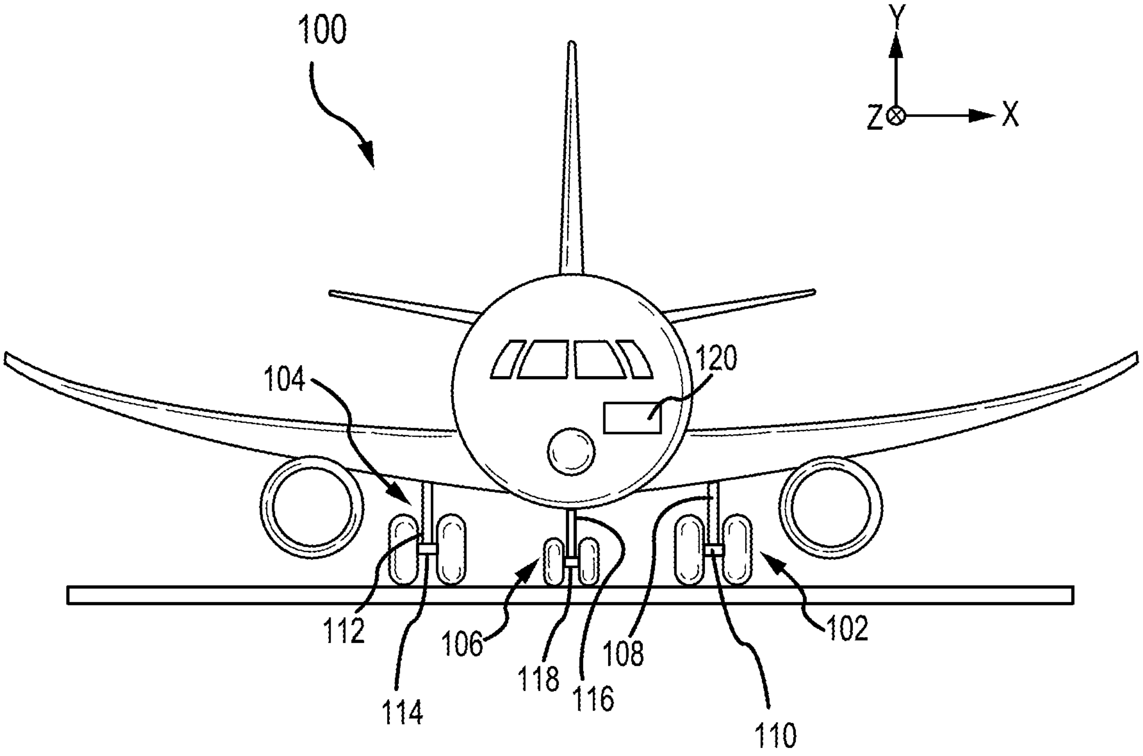
FIG. 1 illustrates an aircraft having left, right and nose landing gear assemblies and wheels mounted thereon, in accordance with various embodiments.

With reference to FIG. 1, an aircraft 100 is illustrated. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118. One or more pilot steering input(s) 120 (e.g., steering wheels, pedals, knobs, or the like) may be located in a cockpit of aircraft 100.

Figure 2:
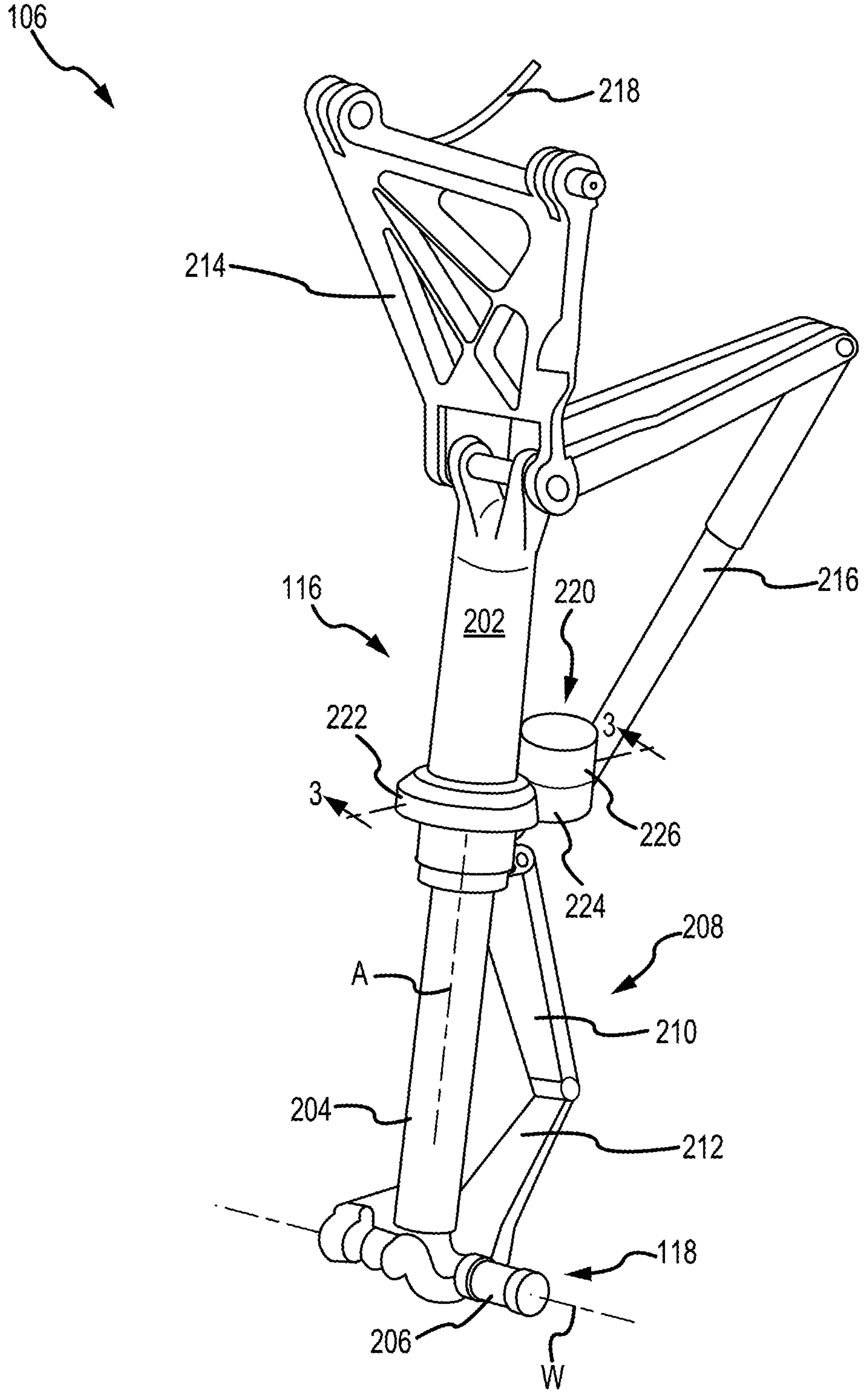
FIG. 2 illustrates a nose landing gear assembly, in accordance with various embodiments.

Referring now to FIG. 2, nose landing gear assembly 106 is illustrated. In accordance with various embodiments, shock strut assembly 116 of nose landing gear assembly 106 includes a strut cylinder 202 and a strut piston 204. Strut piston 204 may be operatively coupled to strut cylinder 202. Strut cylinder 202 may be configured to receive strut piston 204 in a manner that allows the two components to telescope with respect to one another. Strut piston 204 may translate into and out strut cylinder 202, thereby absorbing and damping loads imposed on nose landing gear assembly 106. An axle 206 of nose wheel assembly 118 may be coupled to an end of strut piston 204 that is opposite strut cylinder 202. The nose wheels have been removed from nose wheel assembly 118 in FIG. 2 to more clearly illustrate the features of shock strut assembly 116.

In various embodiments, nose landing gear assembly 106 may include a torque link 208 coupled to shock strut assembly 116 and/or to axle 206. Torque link 208 includes a first (or upper) arm 210 and a second (or lower) arm 212. First arm 210 is pivotably coupled to second arm 212. Strut cylinder 202 is coupled to an attachment linkage 214 configured to secure shock strut assembly 116 to the aircraft 100 and to translate nose landing gear assembly 106 between the landing gear up and landing gear down positions. Nose landing gear assembly 106 may include one or more drag brace(s) such as drag brace 216. In various embodiments, drag brace 216 may be located proximate an aft side of shock strut assembly 116. Nose landing gear assembly 106 may include one or more hydraulic fluid lines (e.g., conduits), such as hydraulic fluid line 218.

In accordance with various embodiments, nose landing gear assembly 106 includes a nose-wheel steering system 220. Nose-wheel steering system 220 is operably coupled to nose wheel assembly 118 via shock strut assembly 116. In this regard, and as described in further detail below, nose-wheel steering system 220 is configured to rotate strut piston 204 about a piston axis of rotation A (also reference to as "axis A"), thereby adjusting the orientation of the nose wheel assembly 118 and the taxiing direction of the aircraft 100. Axis of rotation A may be parallel to the direction of translation of strut piston 204 relative to strut cylinder 202. In various embodiments, axis of rotation A may be generally perpendicular to the axis of rotation W of nose wheel assembly 118. As used in the previous context only, "generally perpendicular" means±10° from perpendicular.

Nose-wheel steering system 220 includes a steering collar housing 222, a gear assembly housing 224, and an actuator housing 226. In various embodiments, gear assembly housing 224 and actuator housing 226 may include a generally cylindrical shape. For example, a cross-section of gear assembly housing 224 and actuator housing 226, taken in a plane perpendicular to axis of rotation A, may be generally circular. While gear assembly housing 224 and actuator housing 226 are illustrated as located on an aft-side of steering collar housing 222, the size and/or shape of gear assembly housing 224 and actuator housing 226, along with the orientation of the rotating components located in steering collar housing 222, gear assembly housing 224, and actuator housing 226 (described in further detail below), allow gear assembly housing 224 and actuator housing 226 to be located in other locations about axis of rotation A. For example, gear assembly housing 224 and actuator housing 226 may be located on the forward-side, the port-side, or the starboard-side of steering collar housing 222. In this regard, a location of gear assembly housing 224 and actuator housing 226 may be selected based not only on available space, but also based on aesthetics.

Figure 3:
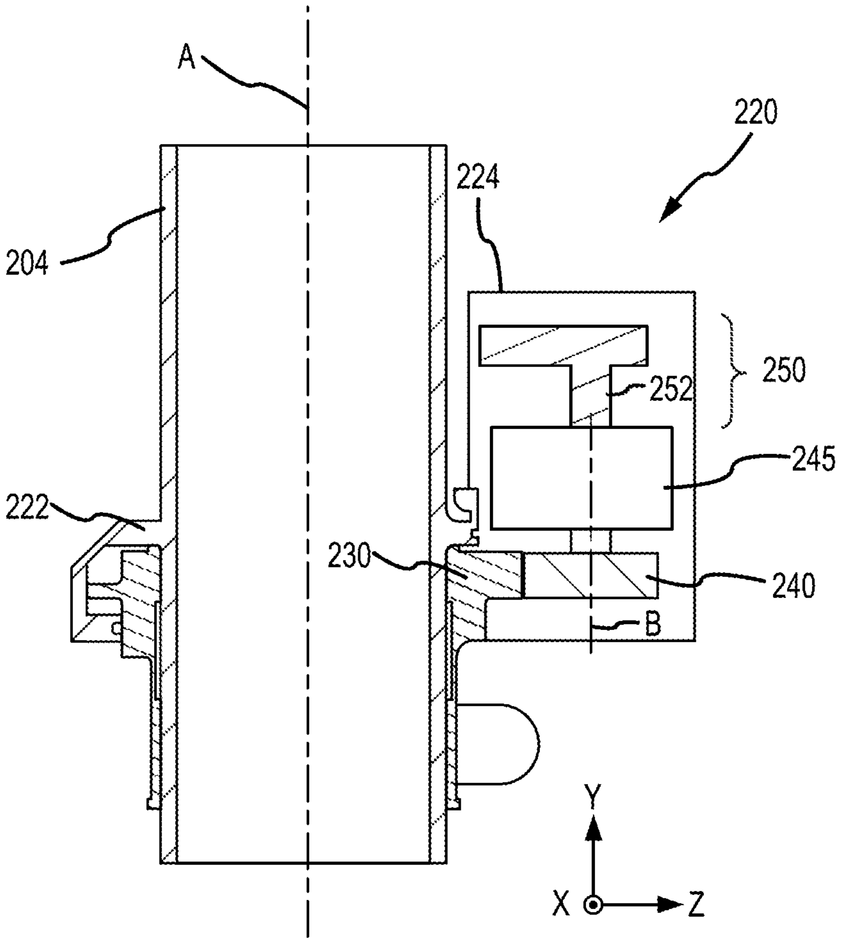
FIG. 3 illustrates a cross-section view of a nose-wheel steering system taken along the line 3-3 in FIG. 2, in accordance with various embodiments.

Referring now to FIG. 3, a cross-section view of the nose-wheel steering system 220 is illustrated. The nose-wheel steering system 220 includes a collar gear 230. Collar rear may be located in steering collar housing 222. Collar gear 230 is coupled to strut piston 204 such that rotation of collar gear 230 about axis of rotation A is transferred to strut piston 204. In this regard, rotation of collar gear 230 about axis of rotation A causes rotation of strut piston 204 about axis of rotation A.

Nose-wheel steering system 220 further includes a gear 240. The gear 240 can be a spur gear in various embodiments. The gear 240 may be located in gear assembly housing 224. The gear assembly housing 224 is schematically depicted in the drawing for ease of illustration. The gear 240 engages (i.e., is intermeshed with) collar gear 230. The gear 240 rotates about a gear axis of rotation B (also referred to as "axis B"). Axis of rotation B can be parallel to the axis of rotation A. In various embodiments, the axis of rotation B is generally parallel to the axis of rotation A of the collar gear 230. As used in the previous context only, "generally parallel" means±5°. It should be understood that the axis of rotation B can be oriented generally perpendicular to the axis of rotation A in various embodiments, for example using a bevel gear for the gear 240. In this regard, the particular orientation and/or design of the nose-wheel steering system 220 is not particularly limited.

The gear 240 is operably coupled to an actuator 250. The actuator 250 is configured to drive rotation of the gear 240 about axis of rotation B. In accordance with various embodiments, actuator 250 includes a drive shaft 252 rotationally coupled to the gear 240. In this regard, rotation of drive shaft 252 about axis of rotation B drives rotation of the gear 240 about axis of rotation B, which in turn drives rotation of collar gear 230 about axis of rotation A.

In various embodiments, a gearbox 245—schematically depicted in the drawing for ease of illustration—is disposed between the actuator 250 and the gear 240. The gearbox 245 can include a gear train operably coupled between drive shaft 252 of actuator 250 and the gear 240. For example, the gear train can include a planetary gear system. The drive shaft 252 can form a sun gear of the planetary gear system. The gearbox 245 can be configured to reduce the speed of the drive shaft 252 such that a rotational speed of an output shaft of the gearbox 245 is less than a rotational speed of an input shaft of the gearbox 245. In this manner, the gearbox 245 can increase the torque output of the drive shaft 252. The gearbox 245 can be configured to increase the speed of the drive shaft 252 such that a rotational speed of an output shaft of the gearbox 245 is greater than a rotational speed of an input shaft of the gearbox 245. Coupling the gearbox 245 between the gear 240 and actuator 250 may further decrease the torque associated with actuator 250 rotating strut piston 204 about axis A. Decreasing the torque reequipment of actuator 250 allows for smaller and lighter actuators. It should be understood that the gearbox 245 can be omitted without departing from the scope of the present disclosure, depending on the rotational speed and torque requirements of the particular design.

In various embodiments, the actuator 250 can be any suitable type of actuator. For example, in various embodiments the actuator 250 comprises a rotary vane (e.g., a single vane hydraulic rotary actuator or a dual vane hydraulic rotary actuator), a hydraulic motor, a rack & pinion actuator, and/or a push-pull actuator, among others.

Figure 4B:
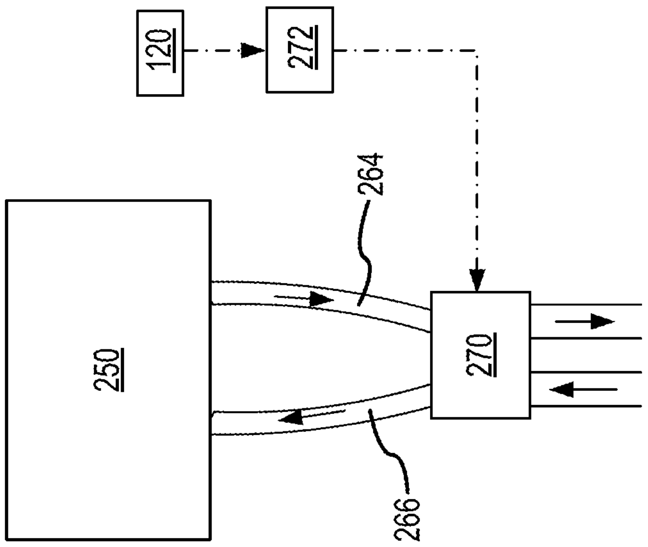
FIGS. 4A and 4B schematically illustrate an actuator fluidly connected with a control valve assembly for a nose-wheel steering system, in accordance with various embodiments.
Figure 4A:
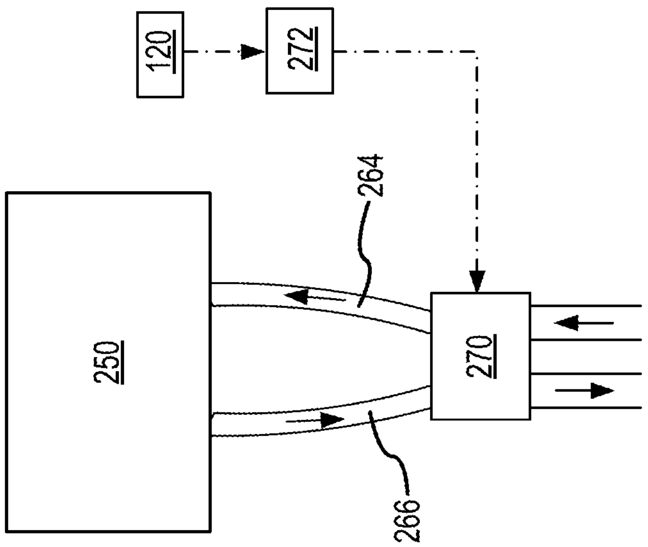

With additional reference to FIG. 4A and FIG. 4B, the actuator 250 is schematically shown fluidly coupled to a control valve assembly 270 whereby the actuator 250 receives hydraulic fluid. The control valve assembly 270 controls flow direction of the hydraulic fluid. In this regard, the actuator 250 is fluidly connected to a first conduit 264 and a second conduit 266. For example, a first hydraulic chamber of the actuator 250 can be fluidly connected to the first conduit 264 and a second hydraulic chamber of the actuator 250 can be fluidly connected to the second conduit 266. The control valve assembly 270 is operably connected to first and second conduits 264, 266. The control valve assembly 270 is configured to control the flow direction of hydraulic fluid to and from the actuator 250. The control valve assembly 270 may include a servo valve, one or more solenoid valve(s), or any valve or combination of valves suitable for controlling the direction of flow to and from the actuator 250. The control valve assembly 270 is operably coupled to a steering controller 272. Actuation of the control valve assembly 270 may be controlled via the steering controller 272. Stated differently, the steering controller 272 is configured to control the opening and closing (i.e., actuation) of control valve assembly 270, thereby controlling the flow direction of hydraulic fluid to and from the actuator 250. The steering controller 272 is operably coupled to pilot steering input 120. The steering controller 272 may send actuation commands to control valve assembly 270 based on signals received from pilot steering input 120.

In operation, and with combined reference to FIG. 3 and FIG. 4A, the actuator 250 (e.g., a first hydraulic chamber of the actuator 250) can be pressurized with hydraulic fluid, which drives rotation of the drive shaft 252, which in turn drives rotation of the gear 240 in the first circumferential direction. Rotation of the gear 240, which has gear teeth configured to engage gear teeth on collar gear 230, causes the collar gear 230 to rotate in a first direction (e.g., a counterclockwise direction) with respect to the axis of rotation A. Rotation of the collar gear 230 in the first direction causes strut piston 204 to likewise rotate in the first direction, thereby enabling the aircraft 100 to turn, for example toward its left (or port-side).

With combined reference to FIG. 3 and FIG. 4B, the process is reversed to enable turning the aircraft 100 to the right (or starboard side). That is, the flow direction of hydraulic fluid through the first and second conduits 264, 266 is reversed. For example, reversing the flow direction through the first and second conduits 264, 266 can cause the first hydraulic chamber of the actuator 250 to be depressurized while a second hydraulic chamber is pressurized with hydraulic fluid, which drives rotation of the drive shaft 252, which in turn drives the gear 240 to rotate in the second circumferential direction about axis of rotation B, which in turn causes the collar gear 230 to rotate in a second direction that is opposite the first direction about axis of rotation A.

Figure 5:
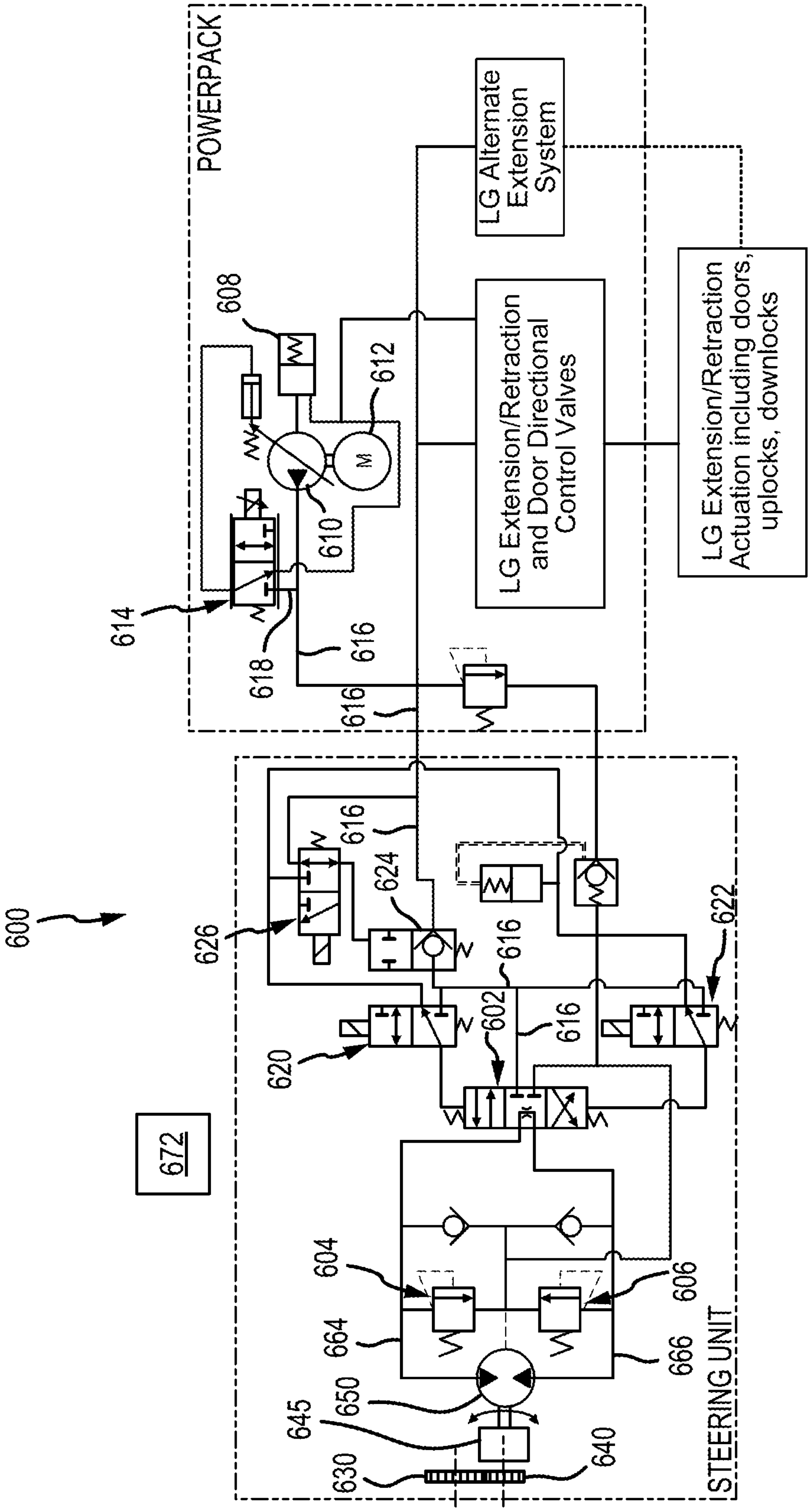
FIG. 5 illustrates an architecture for a hydraulic steering control system, in accordance with various embodiments.

With reference to FIG. 5, a diagram of a hydraulic steering system 600 is illustrated, in accordance with various embodiments. The system 600 can be fluidly coupled to a hydraulic actuator 650. The hydraulic actuator 650 can be similar to the actuator 250 (see FIG. 3 through FIG. 4B). In this regard, the hydraulic actuator 650 can be a rotary hydraulic actuator. The hydraulic actuator 650 can be operatively coupled to a gearbox 645 configured to drive a collar gear 630 via a gear 640. The gearbox 645 can be similar to the gearbox 245 (see FIG. 3). The collar gear 630 can be similar to the collar gear 230 (see FIG. 3). The gear 640 can be similar to the gear 240 (see FIG. 3). In various embodiments, the gearbox 645 can be omitted and the actuator 650 can be mechanically coupled directly to the collar gear 230, for example via the gear 640.

The steerable portion of the landing gear (e.g., the collar gear 630) is actuated by means of hydraulic actuator 650 in a rotary configuration. The actuator 650 is fed via a directional control valve 602, also referred to herein as a mode selection valve. The directional control valve 602 can be a servo valve. The actuator 650 is fed via two distribution lines (i.e., first distribution line 664 and second distribution line 666) that receive hydraulic fluid from an outlet side of the directional control valve 602. Relief valve 604 and relief valve 606 can be fitted to each of the distribution lines 664, 666, respectively. The relief valve 604 can enable a certain quantity of fluid to be discharged in the event of the pressure in the distribution line 664 exceeding the pressure to which the pressure-relief valve 604 is set. The relief valve 606 can enable a certain quantity of fluid to be discharged in the event of the pressure in the distribution line 666 exceeding the pressure to which the pressure-relief valve 606 is set. This disposition protects the actuator 650 against excess pressure.

A first inlet of the directional control valve 602 is connected to a pressurized tank 608. The pressurized tank 608 can be maintained at a rated pressure, for example by a rating valve. The pressurized tank 608 can be connected to a pressure-generator device of the aircraft via a branch connection which enables the pressurized tank 608 to be kept full.

A pump 610 is fluidly coupled to the pressurized tank 608. The pump 610 can be driven by a variable speed electric motor 612, together forming an electrically driven pump unit.

A servo valve 614 (also referred to herein as a steering rate servo valve) can be located locally at the pump 610. The servo valve 614 can control flow rate at the pump 610. In an example, the servo valve 614 can control flow rate at the pump 610 by controlling a swash plate angle of the pump 610. The pump 610 is fluidly coupled to the directional control valve 602 via a hydraulic line 616. The servo valve 614 is fluidly connected to the pump 610 via a separate hydraulic line 618. Stated differently, the servo valve 614 is not connected in series between the pump 610 and the directional control valve 602. In this manner, hydraulic fluid pressure can be communicated between the pressurized tank 608 and the directional control valve 602 independent of the servo valve 614. Stated differently, a fluid flow path (e.g., at least partially defined by the hydraulic line 616) between the pressurized tank 608 and the directional control valve 602 is independent of the servo valve 614. In this configuration, the pressure drop between the pump 610 and the hydraulic actuator 650 is decreased. Due to this decreased pressure drop between the pump 610 and the hydraulic actuator 650, the size of the electric motor 612 can be decreased compared to if the servo valve 614 were connected in series between the pump 610 and the hydraulic actuator 650.

In various embodiments, the servo valve 614 is located locally at the pump 610. For example, the servo valve 614 can be located closer to the pump 610 than the directional control valve 602. In various embodiments, a flow path between the pump 610 and the servo valve 614 can be less than a flow path between the servo valve 614 and the directional control valve 602. In various embodiments, a flow path between the directional control valve 602 and the hydraulic actuator 650 can be less than the flow path between the servo valve 614 and the directional control valve 602.

The directional control valve 602 controls flow direction through the hydraulic actuator 650. Moreover, the directional control valve 602 is located locally at the hydraulic actuator 650. By positioning the directional control valve 602 locally at the hydraulic actuator 650, hydraulic fluid volume between the directional control valve 602 and the hydraulic actuator 650 is decreased. Accordingly, the frequency response and controllability of the system is increased. Stated differently, a stiffness or effective bulk modulus of the hydraulic fluid column between the directional control valve 602 and the hydraulic actuator 650 is increased.

The directional control valve 602 serves to switch over appropriately the hydraulic feed and return to the chambers of the actuator 650. The hydraulic pressure applied via one of the first distribution line 664 or the second distribution line 666 is converted into rotary motion of the gear 640 to rotate the collar gear 630. Hydraulic pressure can be reversed to reverse the rotary motion of the gear 640 to rotate the collar gear 630 in an opposite direction (e.g., to steer left or to steer right). In this manner, the actuator 650 can be considered from the hydraulic point of view as behaving as a double-acting rotary actuator.

The directional control valve 602 has three positions which define three modes of operations for the steering system 600, namely: (1) a steering off/shimmy damper free caster mode; (2) a steering on/steer left mode; and (3) a steering on/steer right mode.

In the steering off/shimmy damper free caster mode, the two outlets of the directional control valve 602 are connected via a constriction that limits the flow of hydraulic fluid between the first distribution line 664 and the second distribution line 666 to dampen and/or prevent rapid movement of the collar gear 630. The constriction can damp any oscillating motion to which the steerable portion of the landing gear might be subjected, in order to avoid harmful coupling between such oscillatory motion and resonant modes of the landing gear.

In the steering on/steer left mode, the second distribution line 666 is connected with the pump 610 and the pressurized tank 608 via the hydraulic line 616 to thereby cause hydraulic fluid to flow into the actuator 650 from the second distribution line 666 to cause the collar gear 630 to rotate in a second direction (e.g., to steer left).

In the steering on/steer right mode, the first distribution line 664 is connected with the pump 610 and the pressurized tank 608 via the hydraulic line 616 to thereby cause hydraulic fluid to flow into the actuator 650 from the first distribution line 664 to cause the collar gear 630 to rotate in a first direction (e.g., to steer right).

A second inlet of the directional control valve 602 can be in fluid communication with a first solenoid valve 620 for controlling the directional control valve 602 to move to a first position (e.g., the steering on/steer left mode). The first solenoid valve 620 can be configured to receive hydraulic fluid pressure from the pump 610 via the hydraulic line 616. The first solenoid valve 620 can be a piloting solenoid valve.

A third inlet of the directional control valve 602 can be in fluid communication with a second solenoid valve 622 for controlling the directional control valve 602 to move to a second position (e.g., the steering on/steer right mode). The second solenoid valve 622 can be configured to receive hydraulic fluid pressure from the pump 610 via the hydraulic line 616. The second solenoid valve 622 can be a piloting solenoid valve.

A shutoff valve 624 can be positioned upstream from the directional control valve 602. The shutoff valve 624 can be configured to decouple the directional control valve 602 from the pressurized tank 608 and the pump 610. A third solenoid valve 626 can control the shutoff valve 624. The third solenoid valve 626 can be configured to receive hydraulic fluid pressure from the pump 610 via the hydraulic line 616 for actuating the shutoff valve 624 between the on position and the off position.

In various embodiments, the system 600 further includes a control unit 672, which includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 672 controls, at least various parts of, the flight of, and operation of various components of, the system 600. For example, the control unit 672 can control various aspects of the system 600, such as hydraulics systems, steering, and the like. The control unit 672 can be in electronic communication with the servo valve 614, the first solenoid valve 620, the second solenoid valve 622, and/or the shutoff valve 624. The control unit 672 can be in electronic communication with the electric motor 612. In various embodiments, the control unit 672 is similar to the steering controller 272 of FIG. 4A and FIG. 4B.

Figure 6:
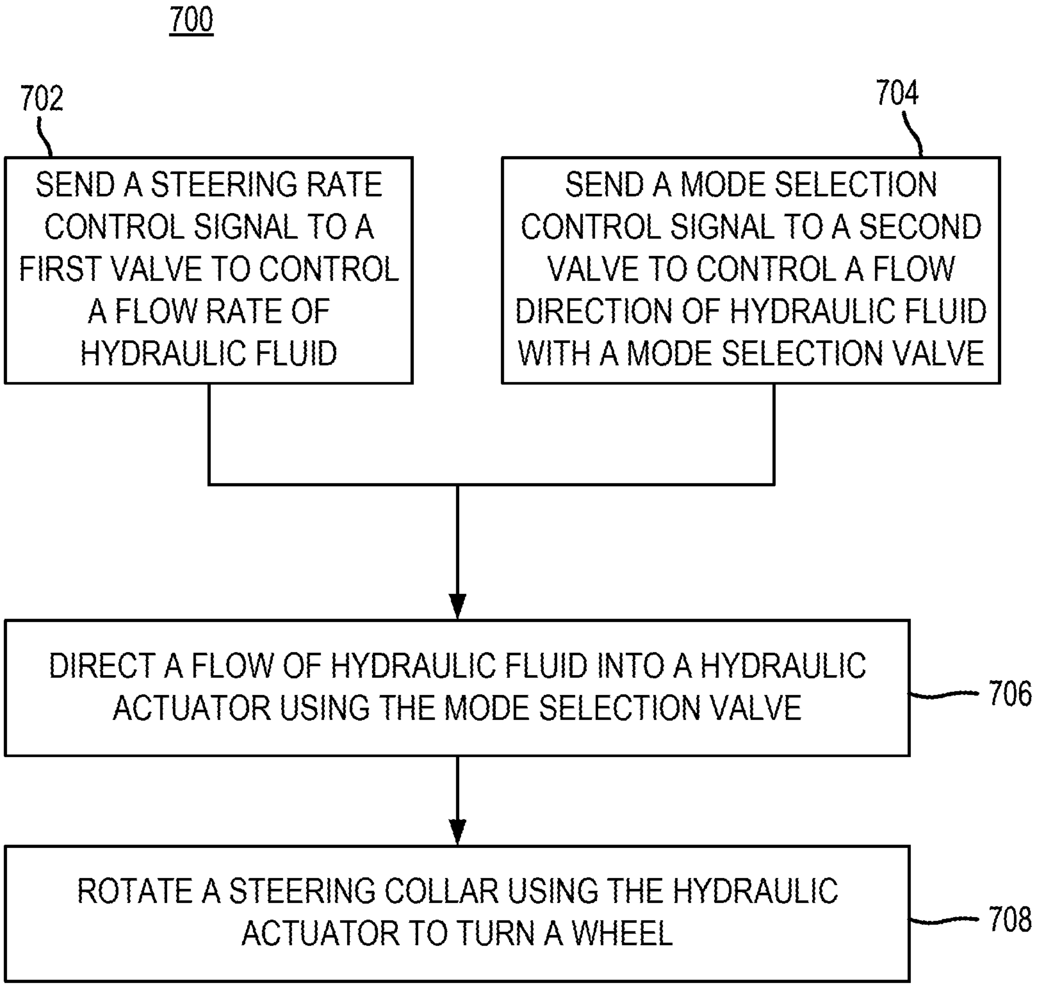
FIG. 6 is a flow chart for a method for controlling steering of an aircraft, in accordance with various embodiments.

With reference to FIG. 6, a flowchart illustrating a method 700 is provided. In various embodiments, the method 700 is a method for controlling steering of an aircraft. For ease of description, the method 700 is described below with reference to FIG. 5. The method 700 of the present disclosure, however, is not limited to use of the exemplary system 600 of FIG. 5.

In step 702, the method 700 includes sending, by a controller (e.g., the control unit 672), a steering rate control signal to a first valve (e.g., the servo valve 614) to control a flow rate of hydraulic fluid. For example, the control unit 672 can control the flow rate of the hydraulic fluid by controlling a swash plate angle of the pump 610 via the servo valve 614 and/or controlling a rotational speed of the electric motor 612. The flow rate of the hydraulic fluid can in turn control a steering rate or rotational speed of the collar gear 630.

In step 704, the method 700 includes sending, by a controller (e.g., the control unit 672), a mode selection control signal to a second valve (e.g., the solenoid valve 620 and/or the solenoid valve 622) to control a flow direction hydraulic fluid. For example, the control unit 672 can control the solenoid valve 620 and/or the solenoid valve 622 to actuate the directional control valve 602 between the three modes of operation.

In step 706, the method 700 includes directing a flow of hydraulic fluid into a hydraulic actuator (e.g., the hydraulic actuator 650) using the mode selection valve (e.g., the directional control valve 602). For example, the hydraulic fluid can be directed to the hydraulic actuator 650 from the first distribution line 664 or the second distribution line 666 depending on the mode of the directional control valve 602 and the desired turning direction.

In step 708, the method 700 includes rotating a steering collar (e.g., the collar gear 630) using the hydraulic actuator (e.g., the hydraulic actuator 650) to turn a wheel (e.g., the nose wheel assembly 118 of FIG. 1).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A nose-wheel steering system, comprising:

a collar gear operatively coupled to a strut piston and configured to rotate the strut piston about a piston axis of rotation;

a hydraulic actuator operatively coupled to the collar gear and configured to drive a rotation of the collar gear;

a first conduit fluidly coupled to the hydraulic actuator;

a second conduit fluidly coupled to the hydraulic actuator;

a steering rate servo valve located proximate a hydraulic pump and configured to control a flow rate of a hydraulic fluid from a hydraulic fluid source through the hydraulic actuator;

a mode selection valve moveable between a steering off position, a steer left position, and a steer right position, the first conduit and the second conduit extend between and to the mode selection valve and the hydraulic actuator;

a first hydraulic fluid line coupled between the hydraulic fluid source and the mode selection valve; and a second hydraulic fluid line separate from the first hydraulic fluid line whereby the steering rate servo valve receives hydraulic fluid pressure from the first hydraulic fluid line, and a hydraulic fluid pressure is communicated between the hydraulic fluid source and the mode selection valve independent of the steering rate servo valve;

wherein, in the steer right position, the mode selection valve directs the hydraulic fluid to the hydraulic actuator via the first conduit and away from the hydraulic actuator via the second conduit; and in the steer left position, the mode selection valve directs the hydraulic fluid to the hydraulic actuator via the second conduit and away from the hydraulic actuator via the first conduit.

2. The nose-wheel steering system of claim 1, wherein the mode selection valve is coupled to the first conduit and the second conduit, the mode selection valve being configured to control fluid flow direction to the hydraulic actuator via each of the first conduit and the second conduit.

3. The nose-wheel steering system of claim 2, wherein the hydraulic actuator comprises a drive shaft, and the drive shaft is rotationally coupled to the collar gear via a gear.

4. The nose-wheel steering system of claim 2, wherein, in the steering off position, the mode selection valve forms a constriction between the first conduit and the second conduit in a shimmy damper free caster mode.

5. The nose-wheel steering system of claim 1, further comprising a steering controller operably coupled to the mode selection valve, wherein the steering controller is configured to control actuation of the mode selection valve.

6. The nose-wheel steering system of claim 5, further comprising a first piloting solenoid valve and a second piloting solenoid valve, and the steering controller is configured to control actuation of the mode selection valve via the first piloting solenoid valve and the second piloting solenoid valve.

7. The nose-wheel steering system of claim 6, wherein the first piloting solenoid valve and the second piloting solenoid valve are hydraulically coupled to the mode selection valve through separate pilot lines configured to receive hydraulic pressure from the hydraulic fluid source to selectively shift the mode selection valve between the steer-left position and the steer-right position.

8. The nose-wheel steering system of claim 1, wherein a fluid flow path between the hydraulic fluid source and the mode selection valve is independent of the steering rate servo valve.

9. The nose-wheel steering system of claim 1, wherein the mode selection valve is located proximate the hydraulic actuator.

10. The nose-wheel steering system of claim 1, wherein the first hydraulic fluid line and the second hydraulic fluid line form parallel flow paths such that hydraulic fluid is deliverable to the mode selection valve without passing through the steering rate servo valve.

11. An aircraft landing gear assembly, comprising:

a shock strut assembly including a strut cylinder and a strut piston configured to telescope relative to the strut cylinder; and a steering system coupled to the shock strut assembly and configured to rotate the strut piston about a piston axis of rotation, the steering system comprising:

a hydraulic actuator configured to drive rotation of a gear about a second axis;

a collar gear intermeshed with the gear and configured to rotate about the piston axis of rotation;

a first conduit fluidly coupled to the hydraulic actuator;

a second conduit fluidly coupled to the hydraulic actuator;

a steering rate servo valve configured to control a flow rate of a hydraulic fluid from a hydraulic fluid source through the hydraulic actuator;

a mode selection valve moveable between a steering off position, a steer left position, and a steer right position, the first conduit and the second conduit extend between and to the mode selection valve and the hydraulic actuator;

a first hydraulic fluid line coupled between the hydraulic fluid source and the mode selection valve; and a second hydraulic fluid line separate from the first hydraulic fluid line whereby the steering rate servo valve receives hydraulic fluid pressure from the first hydraulic fluid line, and a hydraulic fluid pressure is communicated between the hydraulic fluid source and the mode selection valve independent of the steering rate servo valve;

wherein, in the steer right position, the mode selection valve directs the hydraulic fluid to the hydraulic actuator via the first conduit and away from the hydraulic actuator via the second conduit; and in the steer left position, the mode selection valve directs the hydraulic fluid to the hydraulic actuator via the second conduit and away from the hydraulic actuator via the first conduit.

12. The aircraft landing gear assembly of claim 11, wherein the mode selection valve is coupled to the first conduit and the second conduit, the mode selection valve being configured to control fluid flow direction to the hydraulic actuator via each of the first conduit and the second conduit.

13. The aircraft landing gear assembly of claim 12, wherein the hydraulic actuator comprises a drive shaft, and the drive shaft is rotationally coupled to the collar gear via the gear, and the hydraulic actuator is configured to rotate the drive shaft to drive rotation of the gear.

14. The aircraft landing gear assembly of claim 13, wherein the steering system further comprises a gear train rotationally coupled between the drive shaft of the hydraulic actuator and the gear.

15. The aircraft landing gear assembly of claim 12, further comprising a steering controller operably coupled to the mode selection valve, wherein the steering controller is configured to control actuation of the mode selection valve.

16. The aircraft landing gear assembly of claim 15, further comprising a first piloting solenoid valve and a second piloting solenoid valve, and the steering controller is configured to control actuation of the mode selection valve via the first piloting solenoid valve and the second piloting solenoid valve.

17. The aircraft landing gear assembly of claim 12, wherein the hydraulic actuator comprises a hydraulic rotary actuator.

18. The aircraft landing gear assembly of claim 12, wherein, in the steering off position, the mode selection valve forms a constriction between the first conduit and the second conduit in a shimmy damper free caster mode.

19. An architecture for a hydraulic steering control system, comprising:

a hydraulic actuator;

a first conduit fluidly coupled to the hydraulic actuator;

a second conduit fluidly coupled to the hydraulic actuator;

a mode selection valve moveable between a steering off position, a steer left position, and a steer right position;

a steering rate servo valve configured to control a flow rate of a hydraulic fluid being supplied to the mode selection valve from a hydraulic fluid source;

a first hydraulic fluid line whereby the mode selection valve receives hydraulic fluid from the hydraulic fluid source; and a second hydraulic fluid line separate from the first hydraulic fluid line whereby the steering rate servo valve receives hydraulic fluid pressure from the first hydraulic fluid line, a hydraulic fluid pressure is communicated between the hydraulic fluid source and the mode selection valve independent of the steering rate servo valve, and the second hydraulic fluid line forming a first flow path that is separate from a second flow path of the first hydraulic fluid line;

wherein, in the steer right position, the mode selection valve directs the hydraulic fluid to the hydraulic actuator via the first conduit and away from the hydraulic actuator via the second conduit; and in the steer left position, the mode selection valve directs the hydraulic fluid to the hydraulic actuator via the second conduit and away from the hydraulic actuator via the first conduit.

20. The architecture of claim 19, wherein the hydraulic actuator is configured to rotate a strut piston about a piston axis of rotation.

* * * * *